United States Patent
Richter (10) Patent No.: US 10,855,112 B2
(45) Date of Patent: Dec. 1, 2020

(54) WIRELESS HIGH POWER TRANSFER

(71) Applicant: Delta Electronics (Thailand) Public Co., Ltd., Samutprakarn (TH)

(72) Inventor: Ulrich Richter, Freiburg (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 123 days.

(21) Appl. No.: 16/267,094

(22) Filed: Feb. 4, 2019

(65) Prior Publication Data

US 2019/0267842 A1 Aug. 29, 2019

(30) Foreign Application Priority Data

Feb. 28, 2018 (EP) .................................... 18159219

(51) Int. Cl.
*H02J 50/12* (2016.01)
*B60L 53/122* (2019.01)
(Continued)

(52) U.S. Cl.
CPC .............. *H02J 50/12* (2016.02); *B60L 53/12* (2019.02); *B60L 53/122* (2019.02);
(Continued)

(58) Field of Classification Search
CPC .. H02J 50/12; H02J 50/40; H02J 7/025; H02J 50/70; B60L 53/12; B60L 53/122;
(Continued)

(56) References Cited

U.S. PATENT DOCUMENTS

2013/0314035 A1 11/2013 Kohlschmidt
2014/0111151 A1 4/2014 Keeling
(Continued)

FOREIGN PATENT DOCUMENTS

EP 3 168 078 A2 5/2017
JP 2018 011475 A 1/2018
(Continued)

OTHER PUBLICATIONS

Wikipedia contributors. "Series and parallel circuits." Wikipedia, The Free Encyclopedia. Wikipedia, The Free Encyclopedia, Jul. 23, 2020. Web. Jul. 31, 2020. (Year: 2020).*
(Continued)

*Primary Examiner* — Daniel J Cavallari
(74) *Attorney, Agent, or Firm* — Vector IP Law Group LLC; Robert S. Babayi (57) ABSTRACT

In a system for wirelessly transferring power from a primary side across an airgap to a secondary side, the secondary side includes two parallel resonating circuits (27) each including two parallel resonating paths with a series connection of a resonating inductor (28), and a resonating capacitor 29. A rectifier (21) is connected to the output of each resonating path for converting the AC output (12') of the resonating paths to a DC output (13'). The outputs of the rectifiers (21) are connected in parallel to provide the AC output power (13) to a load such as a battery or the like. Each resonating path further includes a symmetry inductance connected in series to improve current sharing among the resonating paths and to reduce the higher harmonic portion in the resonating paths. For balancing the flux each resonating circuit 27 includes in a preferred embodiment of the invention a symmetry winding (30) wound on the same core as the resonating inductor 28 of that resonating path where all
(Continued)

symmetry windings (3) are connected in parallel to ensure optimal flux sharing.

16 Claims, 3 Drawing Sheets

(51) Int. Cl.

| | |
|---|---|
| *H01F 27/245* | (2006.01) |
| *H01F 27/28* | (2006.01) |
| *H01F 38/14* | (2006.01) |
| *H02J 7/02* | (2016.01) |
| *H02J 50/40* | (2016.01) |
| *B60L 53/12* | (2019.01) |
| *H02J 50/70* | (2016.01) |

(52) U.S. Cl.
CPC ........... *H01F 27/245* (2013.01); *H01F 27/28* (2013.01); *H01F 38/14* (2013.01); *H02J 7/025* (2013.01); *H02J 50/40* (2016.02); *B60L 2200/42* (2013.01); *H02J 50/70* (2016.02)

(58) Field of Classification Search
CPC .... B60L 2200/42; H01F 27/245; H01F 27/28; H01F 38/14; B66B 7/00
See application file for complete search history.

(56) References Cited

U.S. PATENT DOCUMENTS

| | | |
|---|---|---|
| 2018/0006498 A1 | 1/2018 | Suzuki |
| 2018/0040416 A1* | 2/2018 | Lestoquoy ............ H01F 27/385 |
| 2019/0267842 A1* | 8/2019 | Richter .................. H01F 38/14 |

FOREIGN PATENT DOCUMENTS

| | | |
|---|---|---|
| WO | 2017/156499 A1 | 9/2017 |
| WO | 2018/031547 A1 | 2/2018 |

OTHER PUBLICATIONS

European Search Report dated Aug. 2, 2018.

* cited by examiner

WIRELESS HIGH POWER TRANSFER

TECHNICAL FIELD

The invention relates to a wireless power transfer arrangement for wirelessly transferring power from a primary side across an airgap to a secondary side by inductive coupling, wherein the primary side includes an input stage for converting an input power to an AC primary output power and a primary resonator for receiving the AC primary output power and inducing a magnetic field and wherein the secondary side includes a secondary resonator for converting the power received through the magnetic field to an AC secondary output power and an output stage for converting the AC secondary output power to a DC secondary output power. The invention further relates to a secondary side for such a wireless power transfer arrangement and a method for wirelessly transferring power from a primary side across an airgap to a secondary side.

BACKGROUND ART

Electrical energy is used in many different applications. To power electrically driven devices, items or objects that are not permanently connected to a source of electrical power, such devices, items or objects are often equipped with one or more batteries that are used to store energy for powering such a device, item or object when it is not connected to a power source. Examples are mobile devices such as cell phones, PDAs (personal digital assistants) and the like, automotive vehicles such as cars, lorries, motorbikes, trains, boats, ships, planes, helicopters and the like but also industrial vehicles such as forklifts, AGVs (automated guided vehicles), cleaning machines, elevators and the like or electrically operated equipment for lifting, displacing or transporting goods of any kind. All these devices, items or objects usually include a battery for operating it.

The invention deals with operating such electrical loads and/or charging their batteries. Whereas Lead-acid batteries have often been used to store power for operating such electrical loads, Li-Ion batteries are now often used for this purpose. One of the reasons is that they may be charged with much higher c-rates. Lead-acid batteries may be charged with a c-rate of about 0.1 c to 0.2 c. This means that a 600 Ah lead-acid battery may be charged with a current of about 60 Amperes to 120 Amperes and would require about 5 to 10 hours. Li-Ion batteries may be charged with a c-rate of up to 1c wherefore a 600 Ah Li-Ion battery may be charged with a current of up to 600 Amperes which reduces the charging time down to about 1 hour. In addition, Li-Ion batteries can be charged occasionally without doing damage to the battery which would happen with Lead-acid batteries when applying multiple short charging cycles for just a small number of minutes.

The high charging currents with Li-Ion batteries may however cause problems with a wire-based charger where the charging current is fed from the power source to the battery via a cable connection where the cable is connected to the source and/or the battery by connectors. The high charging currents would require a charging cable with a large copper diameter and heavy duty connectors. Accordingly, the charging cables are difficult to handle and the connectors would wear out fast. With an occasional charging such connectors would wear out within weeks.

To overcome the problems with the charging cables the charging of such batteries often is done by wireless power transfer. Such a wireless power transfer system is called an inductive power transfer (IPT) system in case the power is transferred wirelessly by inductive coupling. Such IPT Systems do work with loosely coupled inductors.

Another reason to use wireless power transfer is to enhance the usability and the user-friendliness of such devices as for example in connection with cell phones where the user just has to position the phone on top of a charging station instead of connecting the phone to a charger by means of a cable.

High currents for operating or charging electrical loads may however cause further problems. Electrical conductors for higher currents such as for example 600 A (amperes) are usually lossy and rectification of high AC currents may be inefficient.

Document WO 2017/156499 A1 (Wireless Advanced Vehicle Electrification Inc.) discloses such a wireless power transfer system where power from an external power source is inductively transferred to a vehicle and converted within the vehicle for charging its battery. In some examples, two parallel arranged primary and two parallel arranged secondary pads are provided in order to enhance the flexibility of the charging device. However, such a pad arrangement may result in a higher probability of an unequal power sharing which is not desirable. Such an unequal power sharing might be reduced by providing more primary and secondary pads and arranging them such that the magnetic flux is shared among the pads. This would however result in larger and more expensive wireless power transfer systems.

SUMMARY OF THE INVENTION

It is the object of the invention to create a wireless power transfer arrangement pertaining to the technical field initially mentioned, that enables an efficient high power transfer. It is another object of the invention to create a secondary side for such a wireless power transfer arrangement and it's a further object of the invention to provide a method for wirelessly transferring power from a primary side across an airgap to a secondary side.

The solution of the invention is specified by the features of claim 1. In a wireless power transfer arrangement for wirelessly transferring power from a primary side across an airgap to a secondary side by inductive coupling, the primary side includes an input stage for converting an input power to an AC primary output power and a primary resonator for receiving the AC primary output power and inducing a magnetic field. The secondary side includes a secondary resonator for converting the power received through the magnetic field to an AC secondary output power and an output stage for converting the AC secondary output power to a DC secondary output power.

According to the invention, the secondary resonator includes a secondary magnetic core structure and at least two secondary resonating circuits connected in parallel, wherein each secondary resonating circuit includes a resonating path with a resonating inductor and a resonating capacitor connected in series and wherein the resonating inductor includes a winding wound on a section of the secondary magnetic core structure that encompasses a magnetic flux of that secondary resonating circuit. Accordingly, the windings of the resonating inductors of different secondary resonating circuits are wound on different sections of the secondary magnetic core structure. Further, each resonating path includes a symmetry inductance that is connected in series with the resonating inductor and the resonating capacitor of that resonating path.

Such a symmetry inductance improves the power sharing between the resonating paths of a secondary resonating circuit and avoids or at least reduces unwanted harmonic currents in the secondary resonating circuits.

By splitting the secondary side into two or more secondary resonating circuits, the power received through the magnetic field is also split into a corresponding number of portions that are more or less equal portions of power. This reduces the power to be handled per secondary resonating circuits which accordingly reduces the current flowing in each of them. Due to the lower currents the overall efficiency of the system is improved.

The invention may be used in different applications where energy has to be transferred wirelessly to a load such as for example an electric motor, one or more batteries and the like. The power transferred to the load may either be used for directly operating the load such as for example an electric motor or it may be used to charge a battery of another energy storage device for later use. The invention may for example be applied to transfer power to electronic mobile devices such as devices for data, speech or video communication like cell phones, computers etc., PDAs (personal digital assistants), navigation devices, mobile music players, torches and the like. Such mobile devices do however have a low energy usage, at least compared with other applications such as charging the battery of an electric vehicle. Since the invention is particularly useful in applications with a higher energy consumption, the invention is preferably applied in applications where higher powers have to be transferred to a load such as for example for charging batteries of automotive vehicles such as automobiles, vans, lorries, motorbikes, track-bound or railway vehicles, boats, ships or aircrafts such as planes or rotorcrafts, but also industrial vehicles such as forklifts, pallet jacks, AGVs (automated guided vehicles), cleaning machines, elevators, lifts and the like as well as electrically operated equipment for lifting, displacing or transporting goods of any kind such as cranes, the fork or jack of a forklift or pallet jack and the like. Such equipment may be stationary but is often mounted on a vehicle to move the equipment to the place where it is needed and to move the goods.

Any parasitic inductance $L_{par}$ in the resonating path results in unwanted resonances in the secondary side. In an embodiment of the invention with a secondary resonator with three secondary resonating circuits and two resonating paths per secondary resonating circuit, the frequency of these unwanted resonances is for example given by $$f_{unwanted} = \frac{1}{2\pi * \sqrt{\frac{C2}{6} * L_{par}}},$$

wherein C2 is the total capacitance of the secondary resonator. In order to reduce the influence of $L_{par}$, $L_{par}$ has either to become very small or even zero, which is both not possible in reality, or $L_{par}$ has to be chosen such that the resulting unwanted frequency $f_{unwanted}$ is positioned such as to reduce its influence.

Accordingly, by adding such a symmetry inductance to each resonating path, the unwanted frequency $f_{unwanted}$ is changed.

Such a symmetry inductance preferably includes a coil wound on an additional magnetic core element that is not part of the secondary magnetic core structure but may be magnetically connected thereto. In this way, each symmetry inductance is an independent inductor wherefore no flux sharing between the single resonating paths occurs. This results in secondary resonating circuits that have current source characteristics which is needed when for example rectifiers are connected to the resonating paths and galvanically coupled on their outputs.

Each secondary resonating circuit may include a single resonating path with a series connection of a resonating inductor and a resonating capacitor.

In a preferred embodiment of the invention, each secondary resonating circuit includes exactly two resonating paths where each resonating path includes a series connection of a resonating inductor and a resonating capacitor. In this way, the power transferred through the airgap and picked up by the secondary resonator may be split into even more branches such that the portions of power to be handled by each resonating path is even further reduced which again improves the efficiency of the system. In such an embodiment with two resonating paths per secondary resonating circuit, the resonating inductors of the two resonating paths may generally be wound on different sections of the secondary magnetic core structure. However, in order to achieve an even more equalised power sharing between the resonating paths the resonating inductors of the two resonating paths are preferably wound on the same section of the secondary magnetic core structure.

The invention may however also be implemented such that each secondary resonating circuit includes three or more resonating paths each having a series connection of a resonating inductor and a resonating capacitor. The number of resonating paths may depend on the particular application.

The symmetry inductance of a resonating path may be arranged anywhere within the resonating path in series with the inductor and the capacitor but is preferably arranged between the resonating inductor and the resonating capacitor of that resonating path.

Furthermore, the resonating capacitor of a resonating path may include a single capacitance provided anywhere within the resonating path in series with the resonating inductor and the symmetry inductance. But in a preferred embodiment the resonating capacitor of a resonating path is arranged at an output of the resonating circuit to which the output stage is connected. And it is even more preferred that the resonating capacitor is split into two split-capacitors wherein each of them is arranged at a different output terminal of that resonating path. It is to note that each capacitor and/or each split-capacitor may be regarded as a capacitance that may include one or a plurality of capacitors connected in series and/or in parallel such as to result in a desired or required capacitance.

On one hand, the symmetry inductance $L_{sym}$ should be made as small as possible but on the other hand, its influence on the resulting disturbing resonance frequency $f_1$ from rectifier to rectifier is stronger, the lower the resulting unwanted resonance frequency becomes.

It has been found that the best high frequency suppression is achieved where the resulting disturbing resonance frequency $f_1$ from rectifier to rectifier for a given symmetry inductance $L_{sym}$ is as far as possible away from any harmonic of the working resonance frequency of the system. Accordingly, the symmetry inductance $L_{sym}$ is preferably chosen such that $f_1$ is positioned in the middle of two adjacent harmonics of a resonance frequency of the secondary resonator.

$L_{sym}$ could for example be chosen such that $f_1$ is positioned between the $1^{st}$ and the $2^{nd}$ harmonic of the resonance frequency of the secondary resonator. However, in this case $L_{sym}$ would have to be chosen rather large. The higher the resulting unwanted frequency $f_1$ shall be, the smaller $L_{sym}$ can be chosen. The best choice of $L_{sym}$ may also be dependent on the particular application.

As a good compromise it has been found that $L_{sym}$ is preferably chosen such that the resulting unwanted frequency $f_1$ is positioned in the middle between the $2^{nd}$ and the $3^{rd}$ harmonic. The term in the middle in this connection means on a logarithmic scale such that $f_1$ has equal distances to the $2^{nd}$ and the $3^{rd}$ harmonic. And it is to note that it is not necessary that $f_1$ is positioned exactly in the middle of two adjacent harmonics.

For example, a secondary side where the secondary resonator includes three secondary resonating circuits and where each secondary resonator includes two resonating paths with split resonating capacitors, the secondary resonator includes six resonating inductances in parallel and twelve split resonating capacitors, one at each output terminal of the resonating paths. Accordingly, the output stage includes six rectifiers where each of them is connected to the two output terminals of a different resonating path.

In such a secondary resonator, the resulting disturbing resonance frequency $f_1$ from rectifier to rectifier with a given symmetry inductance $L_{sym}$ is given as $$f_1 = \frac{1}{2\pi * \sqrt{C2 * \frac{L_{sym}}{6}}}$$

It is to note the $L_{sym}$ in this case designates the inductance of a single symmetry inductor as provided in each of the resonating paths.

And the resonance working frequency $f_0$ of the current to the rectifiers is given as $$f_0 = \frac{1}{2\pi * \sqrt{C2 * \left(L_2 + \frac{L_{sym}}{6}\right)}}$$

wherein L2 is the total inductance of all resonating inductances of the parallel resonating paths. In this example, L2 is the resulting inductance of the six parallel secondary inductors of the resonating paths.

Now, in order to position f1 in the middle of the $2^{nd}$ and $3^{rd}$ harmonic of the resonance frequency of the secondary resonator, f1 has to be chosen as $$f_1 = 2.45 * f_0$$

because at this point $f_1$ has equal distances to the $2^{nd}$ and the $3^{rd}$ harmonic of the resonance frequency of the secondary resonator on a logarithmic scale.

To find the value for $L_{sym}$ we just have to express $L_{sym}$ as a function of L2, which results in $$L_{sym} = 1.2 * L2$$

Accordingly, in a secondary resonator with three secondary resonating circuits each including two resonating paths with split resonating capacitors, the symmetry inductance $L_{sym}$ is preferably chosen to be between 1.1*L2 and 1.5*L2, wherein L2 is the total inductance of all resonating inductances of the parallel resonating paths. More preferably, the symmetry inductance $L_{sym}$ is chosen to be between 1.15*L2 and 1.3*L2 and most preferred is a value of the symmetry inductance $L_{sym}$ to be equal to 1.2*L2.

In a preferred embodiment of the invention, each secondary resonating circuit includes a symmetry winding that is wound on a section of the secondary magnetic core structure that encompasses the same magnetic flux as the winding of the resonating inductor of that secondary resonating circuit. And in order to balance the magnetic flux within the at least two secondary resonating circuits the symmetry windings are connected in parallel.

Accordingly, the total flux $Phi_{tot}$ of the secondary resonator is split into the fluxes $Phi_1, Phi_2, \ldots, Phi_x$ of the single secondary resonating circuits, where x is the number of secondary resonating circuits. Or in other words, the fluxes $Phi_1, Phi_2, \ldots, Phi_x$ of the single secondary resonant circuits add up to the total flux $Phi_{tot}$ of the secondary resonator:

$$Phi_{tot} = Phi_1 + Phi_2 + Phi_x$$

Without a symmetry winding, the fluxes $Phi_1, Phi_2, \ldots, Phi_n$ may not be exactly equal due to varying parameters, such as unequal air gaps, coil lengths, component variations and the like. They may be somewhat different in magnitude and phase. Such an unequal power sharing may result in different component heating and component stress and may even result in inefficiency and a reduced lifetime of the system.

Paralleling the symmetry windings forces the fluxes $Phi_1, Phi_2, \ldots, Phi_x$ to be equal:

$$Phi_{tot} = Phi_1 + Phi_2 + Phi_X = X * Phi_n$$

wherein $Phi_n$ is the flux of each single secondary resonating circuit. Therefore, the total or common flux $Phi_{tot}$ is shared evenly in magnitude and in phase by the secondary resonating circuits. Hence, each resonating inductor of each resonating path generates the same voltage.

Provision of the symmetry windings therefore makes sure that the magnetic flux picked up by the secondary resonator is evenly shared among all the secondary resonating circuits such that not only the magnetic flux but also the resulting power flow in each of the secondary resonating circuits is equal. Accordingly, also the output power, for example the output current, of all secondary resonating circuits is equal.

In another preferred embodiment of the invention, the symmetry winding of a secondary resonating circuit is wound on the same section of the secondary magnetic core structure as the winding of the resonating inductor of the resonating path of that particular secondary resonating circuit.

Generally, it is possible to arrange the symmetry winding of a particular resonating circuit on a different core part of the secondary magnetic core structure than the winding of the resonating inductor of a resonating path, as long as the magnetic flux through that core part is representative of or corresponds to the magnetic flux through the section including the winding of the resonating inductor. But in order to achieve a better flux and power sharing, the symmetry winding is preferably wound on the same section of the secondary magnetic core structure as the winding of the resonating inductor of the resonating path of that secondary resonating circuit.

And in an embodiment with two resonating paths, the symmetry winding is not only wound on the same section as the windings of the resonating inductors but is preferably wound between the two windings of the two resonating inductors. It would however also be possible to arrange the symmetry winding on the same core section near but not between the two resonating inductor windings, but arranging the symmetry winding between them leads to a symmetric arrangement resulting in an improved flux and power sharing.

In a preferred embodiment of the invention, the sections of the secondary magnetic core structure of the secondary resonating circuits on which the windings of the resonating inductors and the symmetry windings are wound, are arranged in parallel and they are magnetically connected by a first yoke core element on one side and a second yoke core element on another side. Accordingly, the secondary magnetic core structure preferably has a ladder-like shape wherein the yoke core elements form the rails of the ladder-like core structure and the sections form the rungs of the ladder-like core structure. Thereby, the secondary core structure may be built using any type of suitable core elements such as E-core elements, C- or U-core elements, I-core elements or any other suitable type of core elements. The secondary core structure may also be built using a single, i.e. one-piece core element having the desired ladder-like shape.

In another preferred embodiment of the invention, the output stage includes a rectifier for each resonating path, wherein each rectifier is connected to an output of a different resonating path. Accordingly, a rectifier is connected to the output of each resonating path and is adapted to receive the AC output of his resonating path and provide a corresponding DC output power at its output.

However, each rectifier may also include further power stages at its input or at its output such as for example a DC/DC converter or other converters or inverters to provide a output power required or suited for the particular application.

In another preferred embodiment of the invention, the secondaries of the rectifiers are connected in parallel to provide the DC secondary output power at the output of the output stage. Again, the paralleled DC outputs of the rectifiers may—depending on the particular application—be further processed for example by a DC/DC converter or the DC secondary output power may be converted to a AC output output power prior to provide the output to a load.

The primary resonator may include one, two or more primary resonating circuits that are connected in series or in parallel as required by a particular application. Preferably, the primary resonator includes two primary resonating circuits connected in parallel, wherein each of the primary resonating circuit includes a resonating inductor and a resonating capacitor connected in series. Again it is to note that the resonating inductors as well as the resonating capacitors may be split into several inductors or capacitors respectively.

The primary resonator may be chosen as known in the art such as to provide the AC primary output power required by a particular application. Preferably, the primary resonator however includes a magnetic core structure wherein the resonating inductor of each primary resonating circuit includes an O-shaped primary coil and wherein all primary coils are arranged on a same side of the magnetic core structure.

The magnetic core used for the magnetic core structure preferably includes a sheet-like, generally rectangular magnetic core such as a ferrite plate. And the term O-shaped in this connection just means that the coils are wound around an open zone in a middle area of the coils. Accordingly, the single turns of the coils do not have to be circular but may have an oval, a D-like or even rectangular or any other suitable shape as long as they are all wound to leave an open space in a middle area of them. The coils 55 further do not have to have the same shape but may also have different shapes. Such magnetic core structures with two D-shaped coils are for example known in the art as two-D coil arrangements.

As previously mentioned, the wireless power transfer arrangement is preferably adapted for wireless charging of a battery such as for example a battery of automotive and/or industrial vehicles as well as electrically operated equipment.

The adaptation of the wireless power transfer arrangement includes for example that the secondary side may be arranged in or at such vehicles or equipment. And it may for example include communication means for receiving charging or driving commands from a BMS (battery management system) of the battery to be charged or from a load to be driven.

In order to charge a battery that does not include a BMS, the wireless power transfer arrangement may for example adopt the functions of such a BMS. It may for example include a data storage with a charging profile for the battery to be charged and it may include sensors for measuring battery parameters such as voltage, temperature and the like to define an actually needed charging current. It may for example also include means to provide just the right amount of current to the battery to keep the battery voltage constant if the battery has reached a certain voltage.

The solution of the invention regarding the secondary side for a wireless power transfer arrangement as described herein is specified by the features of claim 14.

A secondary side according to the invention includes a secondary resonator as well as an output stage as described herein. And the secondary side is preferably adapted to be arranged in or at a vehicle or equipment as previously mentioned. And the secondary side may include communication means for receiving charging or driving commands from a BMS (battery management system) of the battery to be charged or from a load to be driven. And it may further include means for wireless or wirebound communication with the primary side of a wireless power transfer arrangement as described herein.

The solution of the invention regarding the method for wirelessly transferring power from a primary side across an airgap to a secondary side from a secondary side is specified by the features of claim 15.

A method for wirelessly transferring power from a primary side across an airgap to a secondary side, includes the steps of converting an input power to an AC primary output power by means of an input stage, receiving the AC primary output power and inducing a magnetic field for wireless power transfer by means of a primary resonator, and converting the power received through the magnetic field to an AC secondary output power by means of a secondary resonator and converting the AC secondary output power to a DC secondary output power by means of an output stage.

According to the invention, the steps of converting the power received through the magnetic field to an AC secondary output power and converting the AC secondary output power to a DC secondary output power include the steps of converting the power received through the magnetic field to a plurality of AC secondary output power parts by means of at least two secondary resonating circuits connected in parallel, converting the plurality of AC secondary output power parts to a plurality of DC secondary output power parts and combining the plurality of DC secondary output power parts to provide the DC secondary output power by connecting them in parallel, wherein
converting the power received through the magnetic field by a secondary resonating circuit includes converting the power received through the magnetic field by a resonating path with a series connection of a resonating capacitor and a resonating inductor including a winding wound on a magnetic core element and balancing a magnetic flux within the secondary resonating circuits by providing each secondary resonating circuit with a symmetry winding wound on the same magnetic core element as the resonating inductor and connecting all symmetry windings in parallel.

In a preferred embodiment of the invention, the method for wirelessly transferring power further includes the step of balancing a magnetic flux among the secondary resonating circuits by providing each resonating secondary circuit with a symmetry winding wound on the same magnetic core element as the resonating inductor and connecting all symmetry windings in parallel.

It is to note that every functional or physical unit described herein may not only include the components mentioned but may also include further components not mentioned or shown. for example, a controller for controlling the wireless power transfer arrangement may also include sections or modules for controlling other devices or functions. Or the primary and secondary resonant circuits may also include further components such as for example resistors.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
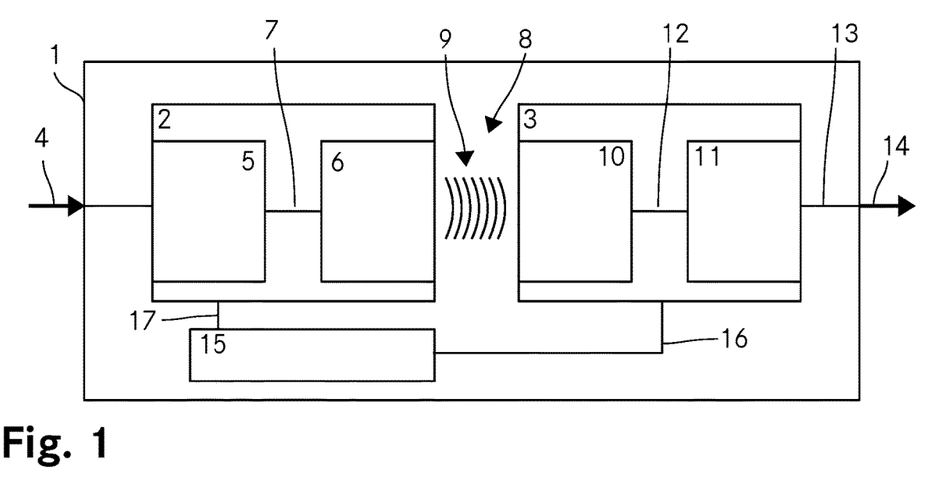
FIG. 1 A schematic of a first embodiment of a wireless power transfer arrangement according to the invention,
FIG. 2 a schematic of another embodiment of a wireless power transfer arrangement according to the invention,
FIG. 3 a schematic of a primary resonator for use in a wireless power transfer arrangement according to the invention,
FIG. 4 a schematic of a further primary resonator for use in a wireless power transfer arrangement according to the invention,
FIG. 5 a schematic of a primary core structure for use in a primary resonator of a wireless power transfer arrangement according to the invention,
FIG. 6 a schematic of a secondary resonator for use in a wireless power transfer arrangement according to the invention,
FIG. 7 a schematic of a secondary core structure for use in a secondary resonator of a wireless power transfer arrangement according to the invention in a top view,
FIG. 8 the secondary core structure of FIG. 7 in a side view,
FIG. 9 a schematic of another secondary core structure for use in a secondary resonator of a wireless power transfer arrangement according to the invention in a top view,
FIG. 10 the secondary core structure of FIG. 9 in a side view,
FIG. 11 a schematic of an application of a wireless power transfer arrangement according to the invention for charging the traction battery of a forklift,
FIG. 12 a schematic of an implementation of a symmetry inductor and
FIG. 13 a schematic of another embodiment of a secondary side of a wireless power transfer arrangement according to the invention.

FIG. 1 shows a schematic representation of a first embodiment of a wireless power transfer arrangement 1 according to the invention. The wireless power transfer arrangement 1 includes a primary side 2, a secondary side 3 and a controller 15. The primary side 2 includes an input stage 5 for converting an input power 4 into an AC primary output power 7 which is fed to a primary resonator 6. The primary resonator 6 induces a magnetic field 9 to wirelessly transmit power across an airgap 8. The secondary side 3 includes a secondary resonator 10 which picks up the magnetic field 9 and converts the power received through the magnetic field 9 into an AC secondary output 12. An output stage 11 is connected to the secondary resonator 10 and converts the AC secondary output 12 to a DC secondary output 13 which is then provided at an output of the wireless power transfer arrangement 1 as an output power 14.

The controller 15 controls the power transfer from the primary side 2 to the secondary side 3 over the airgap 8 such as to meet the requirements of a particular application. The controller 15 controls the primary side 2 for example to meet a certain output power 14 needed by a device connected to the output stage 11. Here, the controller receives some input signal 16 from the secondary side 3 and based on this input signal 16 generates control signals 17 to control the primary side 2 such as to induce a magnetic field 9 to meet the required power at the output of the wireless power transfer arrangement 1. The input signal 16 may for example be a signal representing the power difference between the power outputted by the output stage 11 and the set value for the output power of the output stage 11. The input signal 16 may however also be just a measured value such as for example the actual power, current or voltage at the output stage 11 where the controller 15 therefrom calculates the control signals 17. To do so, the controller 15 also knows the set value for the power, the current or the voltage or the set value is inputted to the controller 15.

The input stage 5 for example includes a converter arrangement for converting an input power 4 to the AC primary output power 7. In the case of an AC input power 4, the converter arrangement for example includes an AC/DC stage, a DC link and a DC/AC inverter. In such a configuration, the control signals 17 for example include the signals to control the input stage 5 by providing the control signals 17 for switching the switches of the inverter.

Whereas the controller 15 is shown to be a separate unit it may also be integrated into any of the units shown in FIG. 1. It may also be split into two or more controller units to control the frequency and the switches and possible also other functions of the wireless power transfer arrangement 1 or even the function of other devices.

Figure 2:
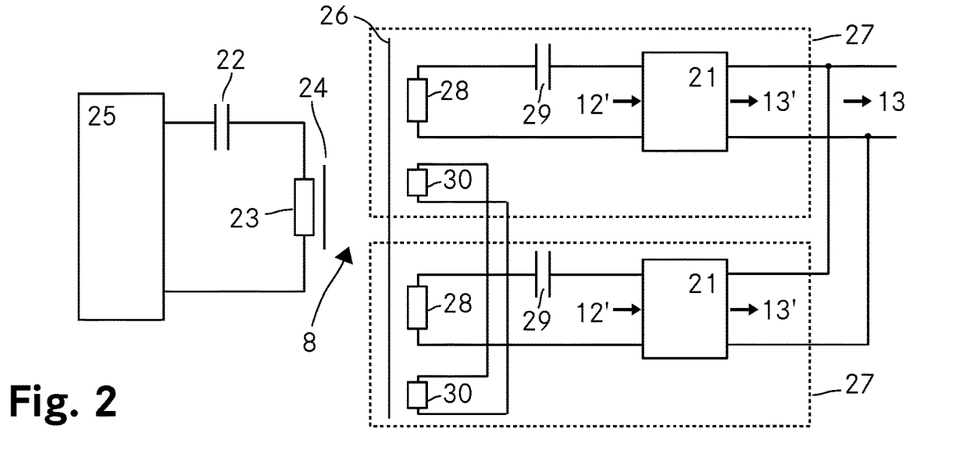

FIG. 2 shows a schematic of another embodiment of a wireless power transfer arrangement according to the invention.

On the primary side the wireless power transfer arrangement includes an inverter 25 which is connected to a primary resonator that includes a capacitor 22 and an inductor 23 connected in series. To induce the magnetic field for power transfer across the airgap 8, the primary resonator further includes a primary core structure 24. The inductor 23 for example includes a winding wound on a section of the core structure 24 to produce a magnetic field that is directed towards the secondary side.

The secondary side includes a secondary core structure 26 and two secondary resonating circuits 27 that are arranged in parallel. The secondary core structure 26 is part of both secondary resonating circuits 27. Each secondary resonating circuits 27 includes a resonating inductor 28 and a resonating capacitor 29 connected in series, where the resonating inductor 28 includes a winding wound on a section of the secondary core structure 26. The output of the secondary resonator provides an AC secondary output 12' that is fed to a rectifier 21. The entirety of the rectifiers forms the output stage of this wireless power transfer arrangement. Each rectifier 21 converts the AC secondary output 12' to a DC secondary output 13' which is then combined by connecting the rectifier outputs in parallel to form the overall DC secondary output 13 which forms the output of the output stage.

Each secondary resonating circuits 27 further includes a symmetry windings 30 that is wound on the same section of the secondary core structure 26 as the winding of the resonating inductor 28 of that resonating circuit 27. And all symmetry windings 30 are connected in parallel to balance the magnetic flux induced within the secondary resonating circuits 27.

Figure 3:
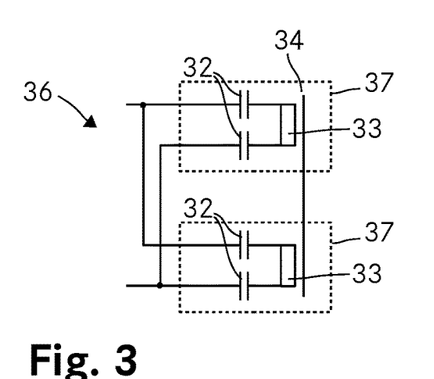

FIG. 3 shows a schematic of a primary resonator 36 for use in a wireless power transfer arrangement according to the invention. The primary resonator 36 includes two primary resonating circuits 37 connected in parallel to an input stage (not shown). Each primary resonating circuits 37 includes a series circuit of a capacitance and an inductance where the capacitance is split into two capacitors 32 and the inductance includes a coil 33 that is connected between the two capacitors 32. The coils 33 include at least one winding wound on a primary core structure 34.

Figure 4:
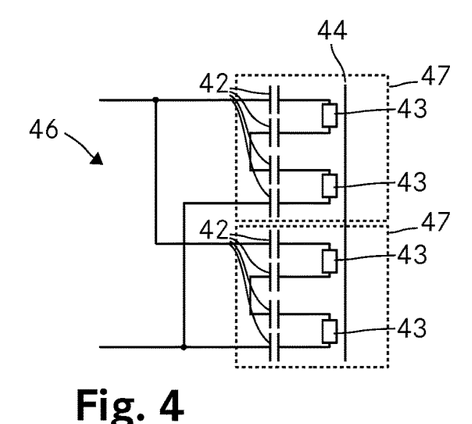

FIG. 4 shows a schematic of a further primary resonator 46 for use in a wireless power transfer arrangement according to the invention. The primary resonator 46 includes two primary resonating circuits 47 connected in parallel to an input stage (not shown). Each primary resonating circuits 47 includes a series circuit of a capacitance and an inductance where the capacitance is split into four capacitors 42 and the inductance includes two coils 43. The capacitors 42 and the coils 43 of a primary resonating circuits 47 form two sub-circuits where each sub-circuit includes a coil 43 that is connected between two of the capacitors 42. Both sub-circuits are connected in series to form a primary resonating circuit 47. The coils 43 include at least one winding wound on a primary core structure 44.

Figure 5:
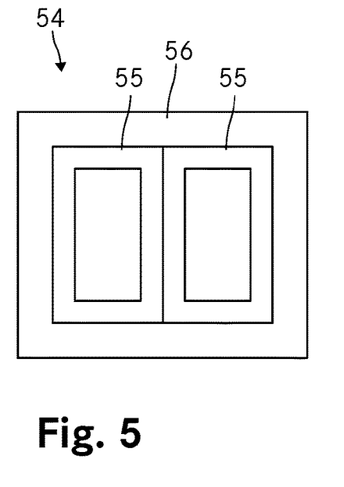

FIG. 5 shows a schematic of a primary core structure 54 for use in a primary resonator of a wireless power transfer arrangement according to the invention. The primary core structure 54 in this example includes a generally rectangular ferrite core sheet 56 and two primary coils 55 arranged on top of the core sheet 56. The coils 55 are wound such that they touch each other or are at least close to each other in a middle area of the core sheet 56 and such that the currents in the coils flow in the same direction in that middle area. In this way, the magnetic field lines are concentrated in that middle area and the resulting magnetic field induced by this primary core structure 54 is directed into a direction perpendicular to the core sheet 56. The coils 55 are for example O-shaped coils as previously described.

The ferrite core sheet 56 is shown to project beyond the coils 55 in every direction. However, the ferrite core sheet 56 may be made smaller such that it does not project beyond the coils 55 in some or even all areas.

Figure 6:
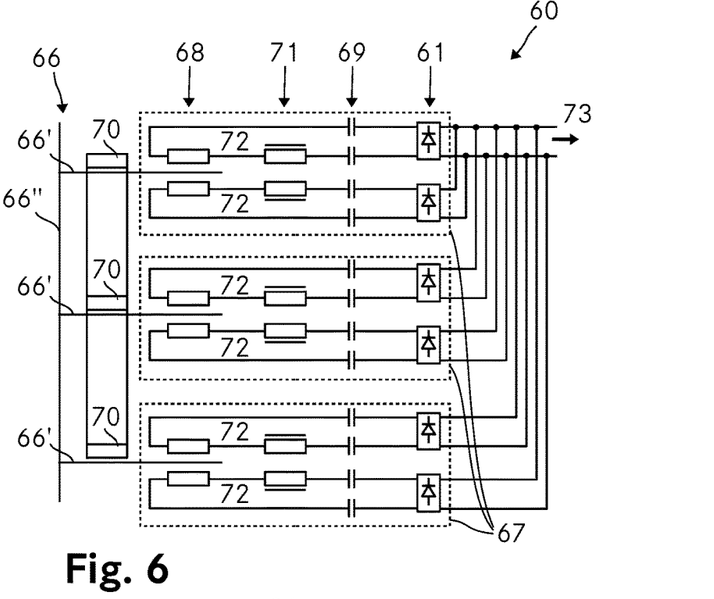

FIG. 6 shows a schematic of a secondary resonator 60 for use in a wireless power transfer arrangement according to the invention. The secondary resonator 60 includes a secondary core structure 66 with a common yoke section 66" and three winding sections 66'. Further, the secondary resonator 60 includes three secondary resonating circuits 67 that are arranged in parallel.

Each secondary resonating circuit 67 includes two parallel resonating paths 72 where each resonating path 72 includes a series circuit of a resonating inductor 68, and a resonating capacitor that is split into two resonating split-capacitors 69 that are arranged at the two output terminals of each resonating path 72. The output of each resonating path is fed to a rectifier 61 that converts the AC output power of a resonating path into a DC output power. Since the output of all rectifiers is connected in parallel, the AC output powers of the single resonating paths is summed to produce the total DC output power 73.

The secondary core structure 66 is part of all three secondary resonating circuits 67. Each resonating inductor 68 includes a winding wound on a winding section 66' of the secondary core structure 66, where the windings of the two resonating inductors 68 of the two resonating paths 72 of a secondary resonating circuit 67 are wound on the same winding section 66' and where the windings of the resonating inductors 68 of different secondary resonating circuits are wound on different windings sections 66'.

Each secondary resonating circuits 67 further includes a symmetry winding 70 where the symmetry winding of a particular resonating circuit 67 is wound on the same winding section 66' as the windings of the two resonating inductors 68 of that particular resonating circuit 67. All symmetry windings 70 are connected in parallel to balance the magnetic flux induced within the secondary resonating circuits 67. Each symmetry winding 70 in this example includes two turns wound around the corresponding windings section 66'. The symmetry windings 70 may however include another number of turns as long as each symmetry winding 70 has the same number of turns as the other symmetry windings 70.

FIG. 6 further shows the symmetry inductances 71 included in each of the resonating paths 72 in series with the resonating inductor 68 and the resonating capacitors 69 of each resonating path 72. In this example, symmetry inductance 71 of a particular resonating path 72 is arranged between the resonating inductor 68 and one of the two resonating split-capacitors 69 of that particular resonating path 72.

It is to note that the entirety of the capacitors 69 at the outputs of the resonating paths is to be chosen such as to result in a total capacitance required in a particular application of the wireless power transfer arrangement. The required capacities may be achieved by providing any suitable combination of single capacitors arranged in parallel and/or series.

Figure 7:
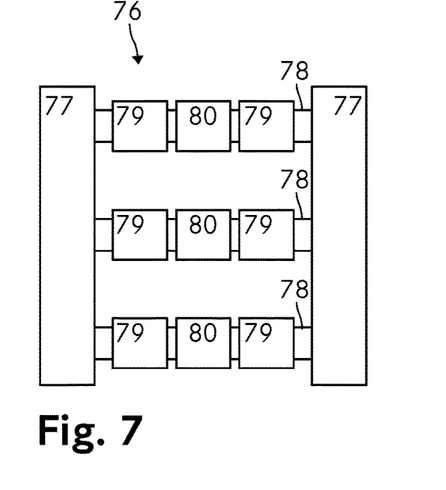
Figure 8:
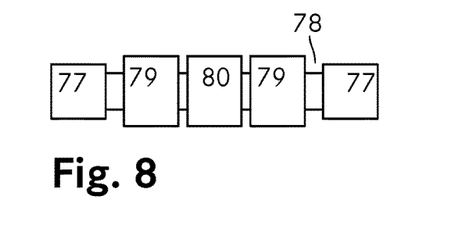

FIGS. 7 and 8 shows a schematic of an exemplary embodiment of a secondary core structure 76 for use in a secondary resonator of a wireless power transfer arrangement according to the invention that has three secondary resonating circuits and two resonating paths per secondary resonating circuit. The secondary core structure 76 may for example be used in the secondary resonator 60 shown in FIG. 6. FIG. 7 shows the secondary core structure in a top view and FIG. 8 shows it in a side view.

The secondary core structure 76 includes two parallel arranged yoke core elements 77 and three winding sections 78 that are arranged parallel to each other in a distance and that are arranged perpendicular to the yoke core elements 77. Each winding section 78 is shown to carry three windings. The two outer windings 79 are the windings of the resonating inductors 68 of the two resonating paths 72 of a secondary resonating circuit 67 and the middle winding 80 is the symmetry winding 70 of that secondary resonating circuit 67.

As shown in FIG. 8, the two yoke core elements 77 and the three winding sections 78 do have a more or less square cross section where the front ends of the winding sections 78 are in contact with the inner side surfaces of the yoke core elements 77.

Figure 9:
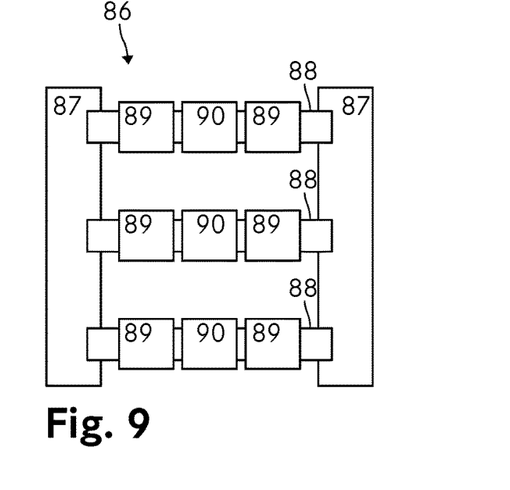
Figure 10:
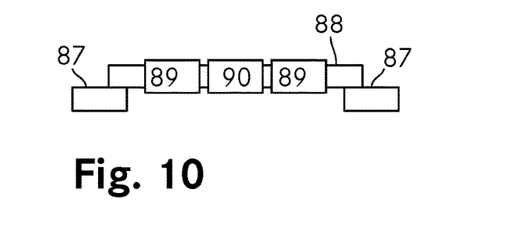

FIGS. 9 and 10 shows a schematic of another exemplary embodiment of a secondary core structure 86 for use in a secondary resonator of a wireless power transfer arrangement according to the invention that has three secondary resonating circuits and two resonating paths per secondary resonating circuit. The secondary core structure 86 may for example be used in the secondary resonator 60 shown in FIG. 6. FIG. 9 shows the secondary core structure in a top view and FIG. 10 shows it in a side view.

The secondary core structure 86 is rather similar to the secondary core structure 76 shown in FIGS. 7 and 8. The secondary core structure 86 also includes two parallel arranged yoke core elements 87 and three winding sections 88 that are arranged parallel to each other in a distance and that are arranged perpendicular to the yoke core elements 87. Each winding section 88 is shown to carry three windings. The two outer windings 89 are the windings of the resonating inductors 68 of the two resonating paths 72 of a secondary resonating circuit 67 and the middle winding 90 is the symmetry winding 70 of that secondary resonating circuit 67.

The difference to the secondary core structure 78 shown in FIGS. 7 and 8 is that the core elements do have a different cross section and are in contact with each other in a different way. As shown in FIG. 10, the two yoke core elements 87 and the three winding sections 88 do have a rectangular, but rather flat cross section. Accordingly, the winding sections 78 are in contact with the flat, upper sides of the yoke core elements 87 by means of the end areas of their lower lateral surfaces. The terms upper and lower in this context are to be understood to have the meaning according to the representation in FIGS. 9 and 10.

The windings 79, 80, 89, 90 may also be arranged in a different way than shown in FIGS. 7 to 10. The two outer windings 79, 89 of the resonating inductors may for example be wound on the winding sections 78, 88 such that they are positioned directly near each other and cover as much of the winding sections 78, 88 as possible. As less as possible shall be visible of each windings section 78, 88. Then, the middle winding 80, 90, i.e. the symmetry windings, are wound on top of the two outer windings 79, 89 such as to further cover the transition area between the two outer windings 79, 89. Such a coil arrangement reduces the field lines undesirably leaving the magnetic core between the windings or even between the single turns of a winding.

Figure 11:
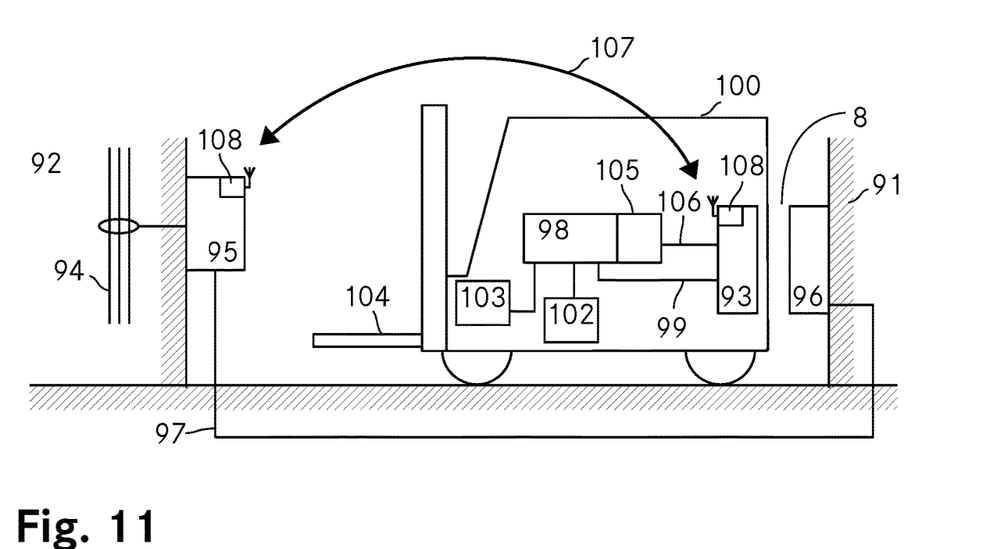

FIG. 11 shows a schematic of an application of a wireless power transfer arrangement according to the invention for charging the traction battery of a forklift.

The input stage of the charging arrangement is in this embodiment arranged in a wallbox 95 which is mounted on a wall of the premises 92 and connected to the power supply network 94 within the premises 92. The primary resonator 96 is mounted on another wall 91 of the premises 92, for example the wall 91 of a garage, a car port, a parking area or the like in or near the premises 92. The primary resonator 96 may also be mounted on the same wall as the wallbox 95 or it may be integrated partly or fully into the wall 91 such that it would require less or no extra space near the wall 91. The primary resonator 96 is connected to the wallbox 95 by means of a fixed cable 97.

A forklift 100 includes the secondary side 93 of the charging arrangement. The forklift 100 further includes a battery 98 with a BMS 105 (battery management system) and two electric motors 102, 103 where the electric motor 102 is used for driving the forklift 100 and the electric motor 103 is used for driving the lift 104 of the forklift 100. The BMS 105 manages the energy flow into and usually also out of the battery 98.

For providing the charging current to the battery 98 of the forklift 100, the secondary side 93 is connected to the battery 98 via the charging line 99 and the secondary side 93 is also connected to the batteries 98 BMS 105 by signal line 106. For charging the battery 98 the BMS 105 defines the charging current allowed or needed at a particular point in time and provides this set value to the secondary side 93 via the signal line 106. The secondary side 93 for example measures the actual current provided to the battery 98, compares the actual current with the set current and calculates therefrom an error signal that is transmitted to the wallbox 95 via a wireless communication link 107 established by the wireless transceivers 108 included in the secondary side 93 as well as in the wallbox 95. The wireless transceiver 108 of the primary side may however also be provided within the primary resonator 96. Based on this current set value the controller then controls the input stage such that the power transferred from the primary resonator 96 through the airgap 8 to the secondary side 93 results in a charging current provided to the battery 98 via the charging line 99 that matches the set value of the BMS 105.

Figures 12, 13:
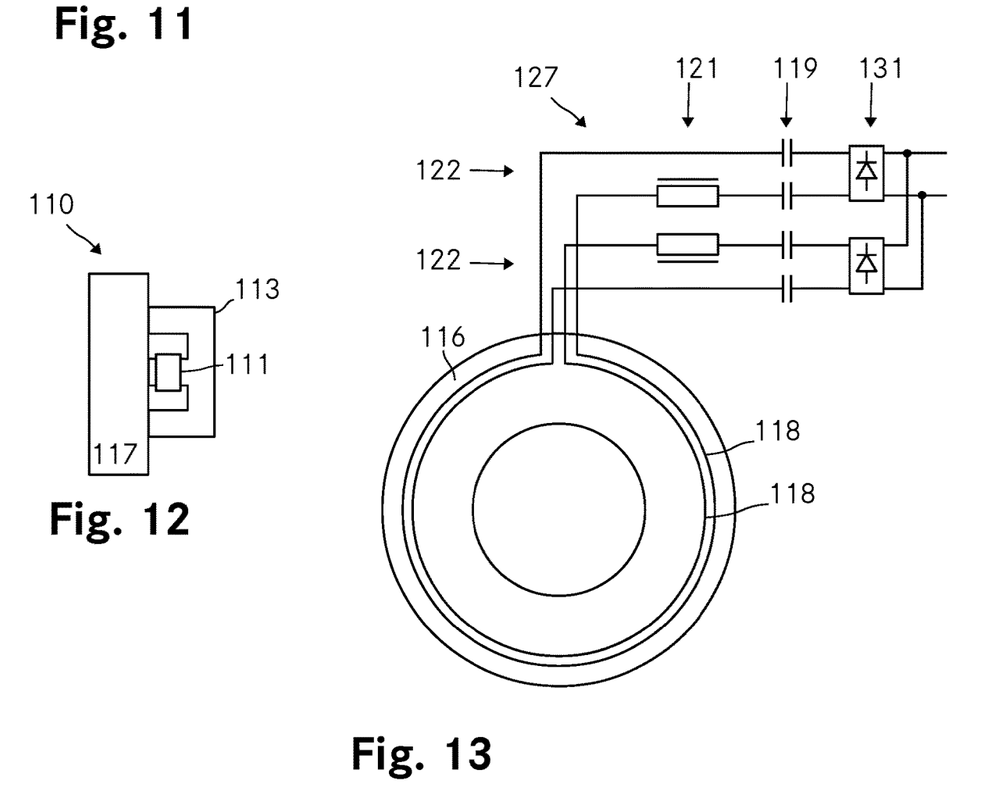

FIG. 12 shows a schematic of an implementation of a symmetry inductor. Shown is a magnetic core structure 110 for winding the coil 111 of a symmetry inductor. The magnetic core structure 110 includes an E-shaped core element 113 with a middle leg and two outer legs. A yoke core element 117 is further arranged such as to close the E-shaped core element 113 to form an 8-shaped core. The coil 111 now is provided on the middle leg of the E-shaped core element 113. The yoke core element 117 may either be a yoke core element of a secondary core structure as previously described or it may also be an additional core element. Accordingly, in a secondary resonator such as for example shown in FIG. 6 having three resonating circuits each including two resonating paths, six E-shaped core elements 113 are provided to implement the six symmetry inductors. Therefore, each of these symmetry inductors is an independent inductor such that there occurs no flux sharing between them.

FIG. 13 shows a schematic of another embodiment of a secondary side of a wireless power transfer arrangement according to the invention. The secondary side includes a secondary resonating circuit 127 with two resonating paths 122. A rectifier 131 is connected to each resonating path 122. Each resonating path 122 includes a symmetry inductance 121, two split-capacitors 119 and two resonating inductors. However, in this embodiment, the resonating inductors of the resonating paths 122 are realised by a circular winding 118 arranged on a circular secondary core element 116. Each circular winding 118 is shown to include just one turn. It is however also possible that each circular winding 118 includes two or more turns. And the circular windings 118 are shown to be arranged on the circular secondary core element 116 near each other. It is however also possible that the circular windings 118 are provided on top of each other or in any other suitable way. The resonating inductors are preferably realised by winding the circular windings 118 and providing them on the secondary core element 116 such that their resulting inductances are equal to each other.

In this embodiment, the circular secondary core element 116 has a ring-like shape, where the circular windings 118 are provided on the ring-shaped part of the circular secondary core element 116. The circular secondary core element 116 could also be implemented as a circular disc, i. e. without a hole in the centre. The circular secondary core element 116 is for example a flat ferrite ring or disc.

In a wireless power transfer arrangement with two or more secondary resonating circuits, such a secondary side arrangement with a common circular secondary core element 116 has the advantage, that the resonating inductors realised by the circular windings 118 do also balance the flux among the secondary resonating circuits. Accordingly, these circular windings take over the flux balancing function of the symmetry windings wherefore no additional symmetry windings are needed in such an arrangement.

In summary, it is to be noted that the invention enables the creation of a wireless power transfer arrangement, a corresponding secondary side and a corresponding method for wireless power transfer that allows an efficient transfer of high powers.

The invention claimed is:

1. A wireless power transfer arrangement for wirelessly transferring power from a primary side across an airgap to a secondary side by inductive coupling, wherein
  a) the primary side includes an input stage for converting an input power to an AC primary output power and a primary resonator for receiving the AC primary output power and inducing a magnetic field,
  b) the secondary side includes a secondary resonator for converting the power received through the magnetic field to an AC secondary output power and an output stage for converting the AC secondary output power to a DC secondary output power,
  characterised in that the secondary resonator includes a secondary magnetic core structure and at least two secondary resonating circuits connected in parallel, wherein
  c) each secondary resonating circuit includes a resonating path with a resonating inductor and a resonating capacitor connected in series,
  d) the resonating inductor includes a winding wound on a section of the secondary magnetic core structure encompassing a magnetic flux of that secondary resonating circuit and
  e) each resonating path includes a symmetry inductance connected in series with the resonating inductor and the resonating capacitor of that resonating path.

2. The wireless power transfer arrangement according to claim 1, wherein each secondary resonating circuit includes two resonating paths arranged in parallel, wherein the resonating inductors of the two resonating paths of a secondary resonating circuit are wound on the same section of the secondary magnetic core structure.

3. The wireless power transfer arrangement according to claim 1, wherein the symmetry inductance of a resonating path is arranged between the resonating inductor and the resonating capacitor of that resonating path, wherein the resonating capacitor is preferably split into two split-capacitors each of them being arranged at a different output terminal of that resonating path.

4. The wireless power transfer arrangement according to claim 1, wherein the symmetry inductance is chosen such that an unwanted resonance frequency of the resonating paths of a secondary resonating circuit is positioned in a middle of two adjacent harmonics of a resonance frequency of the secondary resonator, preferably in the middle of a $2^{nd}$ and a $3^{rd}$ harmonic of the resonance frequency of the secondary resonator.

5. The wireless power transfer arrangement according to claim 4, wherein the secondary resonator includes three secondary resonating circuits each including two resonating paths and the symmetry inductance is chosen to be between 1.1*L2 and 1.5*L2, with L2 being a resulting inductance of the secondary resonator.

6. The wireless power transfer arrangement according to claim 1, wherein each secondary resonating circuit includes a symmetry winding wound on a section of the secondary magnetic core structure encompassing the same magnetic flux of that secondary resonating circuit and all symmetry windings are connected in parallel to balance the magnetic flux within the at least two secondary resonating circuits.

7. The wireless power transfer arrangement according to claim 6, wherein the symmetry winding of a secondary resonating circuit is wound on the section of the secondary magnetic core structure between the secondary windings of the resonating paths of that secondary resonating circuit.

8. The wireless power transfer arrangement according to claim 1, wherein the sections of the secondary magnetic core structure of the secondary resonating circuits are arranged in parallel and magnetically connected by a first yoke core element on one side and a second yoke core element on another side.

9. The wireless power transfer arrangement according to claim 1, wherein the output stage includes a rectifier for each resonating path, wherein each rectifier is connected to an output of a different resonating path.

10. The wireless power transfer arrangement according to claim 9, wherein a secondary of the rectifiers is connected in parallel to provide the DC secondary output power.

11. The wireless power transfer arrangement according to claim 1, wherein the primary resonator includes two primary resonating circuits connected in parallel, wherein each primary resonating circuit includes a resonating inductor and a resonating capacitor connected in series.

12. The wireless power transfer arrangement according to claim 11, wherein the primary resonator includes a magnetic core structure, preferably a sheet-like, generally rectangular magnetic core structure, wherein the resonating inductor of each primary resonating circuit includes an O-shaped primary coil wherein all primary coils are arranged on a same side of the magnetic core structure.

13. The wireless power transfer arrangement according to claim 1, adapted for wireless charging of a battery, particularly the traction battery of a vehicle, particularly of an automotive vehicle.

14. A secondary side for the wireless power transfer arrangement according to claim 1, including said secondary resonator as well as said output stage.

15. A method for wirelessly transferring power from a primary side across an airgap to a secondary side, including the steps of
  f) converting an input power to an AC primary output power by means of an input stage, receiving the AC primary output power and inducing a magnetic field for wireless power transfer by means of a primary resonator, g) converting the power received through the magnetic field to an AC secondary output power by means of a secondary resonator and converting the AC secondary output power to a DC secondary output power by means of an output stage, characterised in that the steps of converting the power received through the magnetic field to an AC secondary output power and converting the AC secondary output power to a DC secondary output power include the steps of h) converting the power received through the magnetic field to a plurality of AC secondary output power parts by means of at least two secondary resonating circuits connected in parallel, i) converting the plurality of AC secondary output power parts to a plurality of DC secondary output power parts and j) combining the plurality of DC secondary output power parts to provide the DC secondary output power by connecting them in parallel, wherein k) converting the power received through the magnetic field by a secondary resonating circuit includes converting the power received through the magnetic field by a resonating path with a series connection of a resonating capacitor and a resonating inductor including a winding wound on a magnetic core element and l) balancing a current flow within the resonating path by providing the resonating path with a symmetry inductance connected in series with the resonating inductor and the resonating capacitor of that resonating path.

16. The method according to claim 15, including a step of balancing a magnetic flux among the secondary resonating circuits by providing each resonating secondary circuit with a symmetry winding wound on the same magnetic core element as the resonating inductor and connecting all symmetry windings in parallel.

* * * * *